United States Patent
Lepp et al.

(10) Patent No.: US 10,893,475 B2
(45) Date of Patent: *Jan. 12, 2021

(54) ADDRESSES IN A WAKE-UP TRIGGER FRAME

(71) Applicant: BlackBerry Limited, Waterloo (CA)

(72) Inventors: James Randolph Winter Lepp, Ottawa (CA); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,363

(22) Filed: Aug. 12, 2019

(65) Prior Publication Data

US 2019/0364506 A1    Nov. 28, 2019

Related U.S. Application Data

(63) Continuation of application No. 15/583,528, filed on May 1, 2017, now Pat. No. 10,383,058.

(51) Int. Cl.
| | |
|---|---|
| *H04W 88/06* | (2009.01) |
| *H04W 84/12* | (2009.01) |
| *H04W 68/02* | (2009.01) |
| *H04W 68/00* | (2009.01) |
| *H04W 52/02* | (2009.01) |
| *H04L 12/741* | (2013.01) |

(52) U.S. Cl.
CPC ......... *H04W 52/0235* (2013.01); *H04L 45/74* (2013.01); *H04W 52/0212* (2013.01); *H04W 68/005* (2013.01); *H04W 68/02* (2013.01); *H04W 84/12* (2013.01); *H04W 88/06* (2013.01); *Y02D 30/70* (2020.08)

(58) Field of Classification Search
CPC .......... H04W 52/0235; H04W 68/005; H04W 52/0212; H04W 68/02; H04W 88/06; H04W 84/12; H04L 45/74; Y02D 30/70; Y02D 70/26; Y02D 70/14; Y02D 70/10; Y02D 70/00; Y02D 70/142
See application file for complete search history.

(56) References Cited

U.S. PATENT DOCUMENTS

| | | | |
|---|---|---|---|
| 7,403,492 | B2 | 7/2008 | Zeng et al. |
| 9,489,023 | B1 | 11/2016 | Ispas |
| 2007/0067445 | A1 | 3/2007 | Vugenfirer et al. |
| 2013/0195001 | A1 | 8/2013 | Liu |
| 2014/0112229 | A1 | 4/2014 | Merlin et al. |

(Continued)

OTHER PUBLICATIONS

IEEE Std 802.11™ -2012, Part 11: Wireless LAN Medium Access Control (MAC) and Physical Layer (PHY) Specifications (Year: 2012).*

(Continued)

*Primary Examiner* — Moo Jeong
(74) *Attorney, Agent, or Firm* — Fish & Richardson P.C.

(57) ABSTRACT

A method for processing a wake-up trigger frame includes receiving, at a wake-up radio of a device and from an access point, a wake-up trigger frame, where the wake-up trigger frame includes a group receiver identity; and in response to determining that the device is associated with the group receiver identity, sending a signal to a primary radio of the device to turn on the primary radio.

20 Claims, 7 Drawing Sheets

(56) References Cited

U.S. PATENT DOCUMENTS

| | | |
|---|---|---|
| 2015/0036576 A1 | 2/2015 | Jafarian et al. |
| 2016/0057605 A1 | 2/2016 | Shellhammer et al. |
| 2016/0274019 A1 | 9/2016 | Peterson et al. |
| 2019/0261273 A1* | 8/2019 | Kim .................. H04W 52/0229 |

OTHER PUBLICATIONS

Chu, "BSS Management through WUR wake up frame" IEEE Draft, vol. 802.11ba, No. 1, XP068158822, Apr. 17, 2017, 11 pages.

Chu, "WUR MAC and Wakeup Frame" IEEE Draft, vol. 802.11ba, No. 4, XP068115186, Mar. 16, 2017, 15 pages.

Extended European Search Report issued in European Application No. 18795108.2 dated Feb. 28, 2020, 9 pages.

Kim et al., "WUR MAC Issues" IEEE 802.11-17/0054r2, Jan. 15, 2017, 15 pages.

PCT International Preliminary Report on Patentability in International Application No. PCT/CA2018/050476, dated Nov. 14, 2019, 7 pages.

IEEE Std 802.11-2016, "IEEE Standard for Information technology; Telecommunications and information exchange between systems Local and metropolitan area networks; Specific requirements—Part 11: Wireless LAN Medium Access Control (MAC) and Physical Layer (PHY) Specifications," Dec. 14, 2016; 3534 pages.

IEEE Std P802.11ax, Project Authorization Request, "IEEE Standard for Information technology—Telecommunications and information exchange between systems Local and metropolitan area networks—Specific requirements—Part 11: Wireless LAN Medium Access Control (MAC) and Physical Layer (PHY) Specifications Amendment Enhancements for High Efficiency WLAN," 2 pages.

Cisco Systems IPv6 Configuration Guide, Chapter: IPv6 Neighbor Discovery, Jul. 2012; 14 pages <http://www.cisco.com/c/en/us/td/docs/ios-xml/ios/ipv6/configuration/15-2mt/ip6-15-2mt-book/ip6-neighb-disc.html>.

Park et al., "Proposal for Low-Power Wake-Up Receiver (LP-WUR) Study Group," Slide Presentation, May 17, 2016; 14 pages <https://mentor.ieee.org/802.11/dcn/16/11-16-0605-03-0wng-proposal-for-lp-wur-study-group.pptx>.

Cain et al., Network Working Group, "Internet Group Management Protocol, Version 3," (RFC 3376), IETF, Oct. 2002; 54 pages <https://tools.ietf.org/html/rfc3376>.

Chu, "WUR MAC Consideration discussion," Slide Presentation, Nov. 6, 2016; 8 pages <https://mentor.ieee.org/802.11/dcn/16/11-16-1460-01-0wur-wur-mac-discussion.pptx>.

Al-Uraiby et al., "Low-profile Wake-up Radio Mechanism for Resource-Constrained Wireless Devices," proceedings of 2014 TRON Symposium (TRONSHOW), Dec. 12, 2014, 9 pages.

Liu et al., "On Waking-Up Multiple WUR Stations," available at http://menthor.ieee.org/802.11/dcn/17/11-17-0028-00-00ba-on-waking-up-of-multiple-wur-stations.pptx, Jan. 15, 2017, 6 pages.

Huang, "IEEE P802.11 Wireless LANs, Specification Framework for Tgba," available at https://menthor.ieee.org/802.11/dcn/17/11-17-0575-00-00ba-spec-framework.docxi, Apr. 10, 2017.

IEEE Standards Association, "Part 11: Wireless LAN Medium Access Control (MAC) and Physical Layer (PHY) Specifications," IEEE Standard for Information technology—Telecommunications and Information Exhange between Systems, Local Metropolitan area networks—Specific requirements, IEEE Std 802.11-2012, Mar. 29, 2012, 9 pages.

Non-Final Office Action issued in U.S. Appl. No. 15/583,528, dated Jul. 2, 2018, 22 pages.

Final Office Action issued in U.S. Appl. No. 15/583,528 dated Nov. 19, 2018, 31 pages.

International Search Report and Written Opinion issued on International Application No. PCT/CA2018/050476 dated Jul. 11, 2018, 10 pages.

* cited by examiner

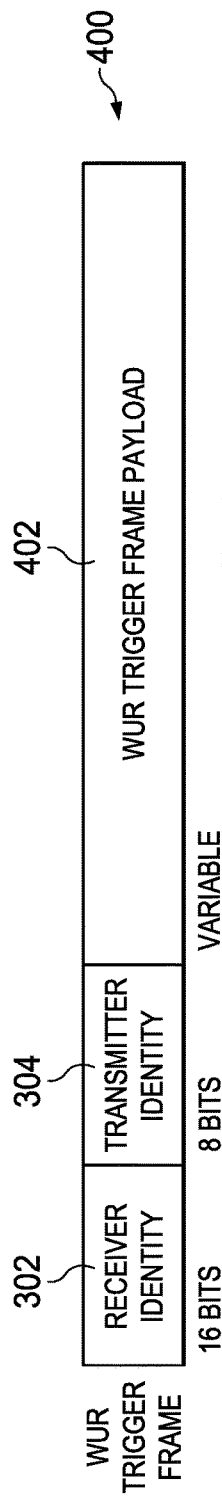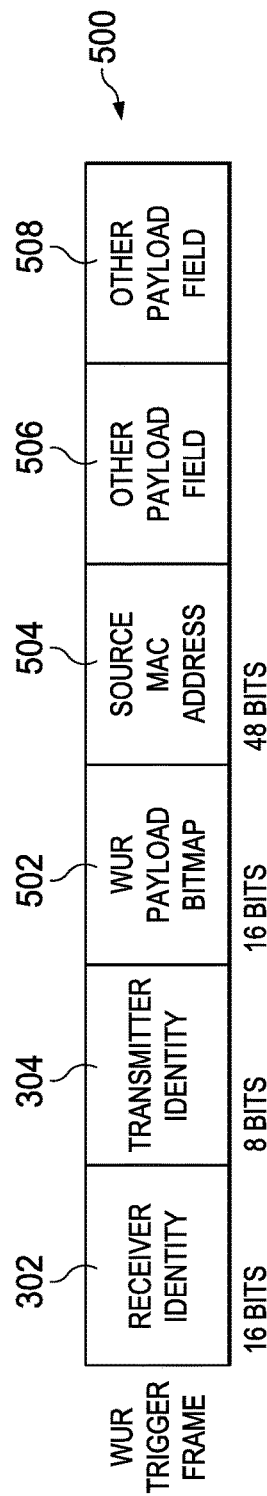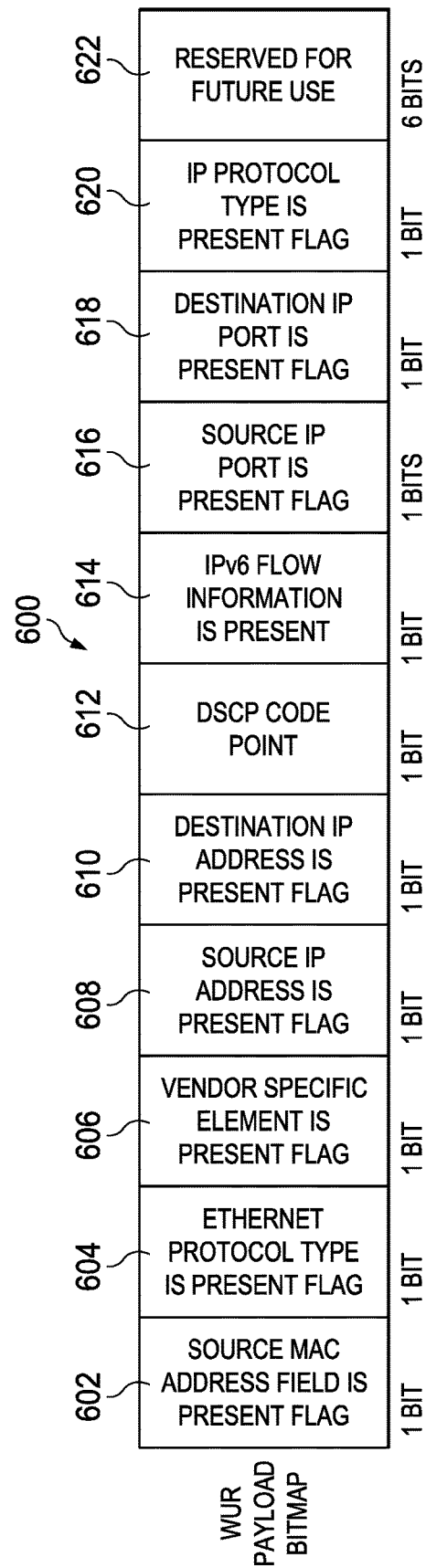

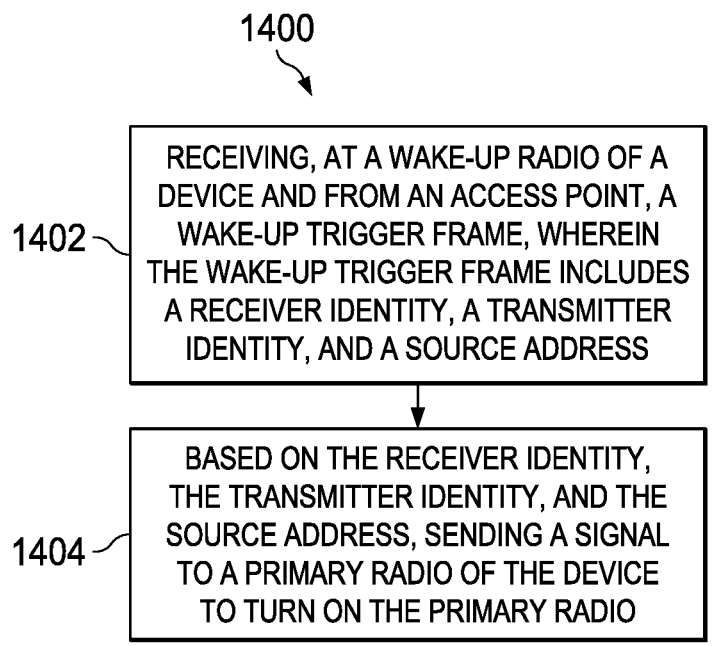
FIG. 14
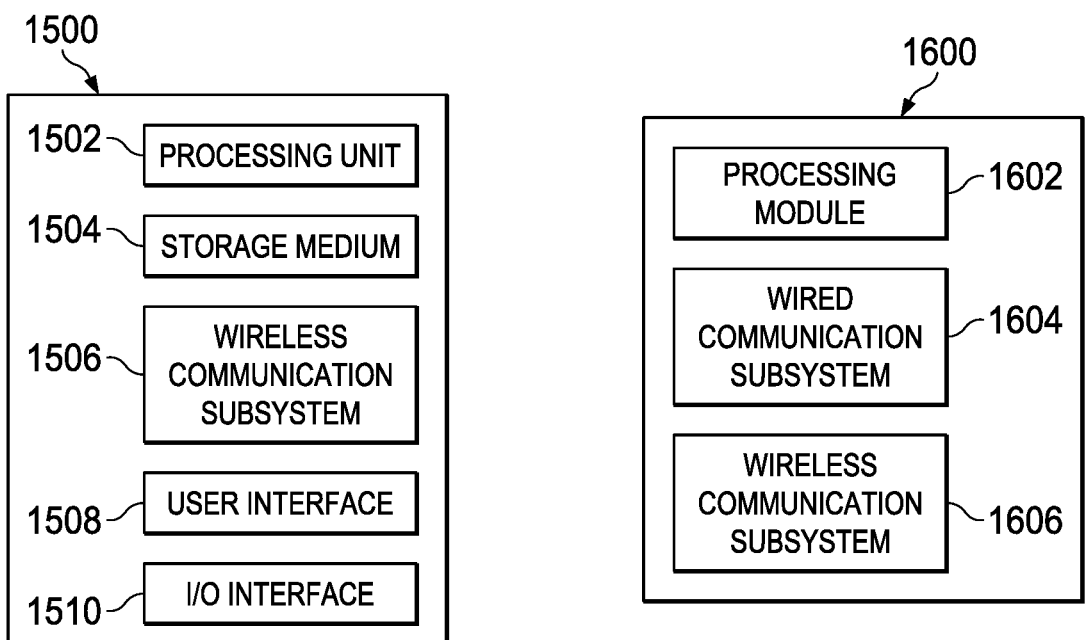
FIG. 15
FIG. 16

ADDRESSES IN A WAKE-UP TRIGGER FRAME

CROSS REFERENCE TO RELATED APPLICATION

This application is a continuation and claims the benefit of U.S. Non-Provisional application Ser. No. 15/583,528, filed May 1, 2017, now U.S. Pat. No. 10,383,058, the entire contents of which are hereby expressly incorporated by reference herein in their entireties.

TECHNICAL FIELD

This disclosure relates to addressing in wireless communication systems.

BACKGROUND

A wake-up radio can be used in devices, such as IEEE 802.11 devices, to save power. For example, a device can include a wake-up radio as well as a primary radio. The wake-up radio can be a simple receiver without any transmission functionality, and the primary radio can have both transmitting and receiving functionalities. The wake-up radio can be active while the primary radio is off. Typically, if the device has no data to transmit or receive, the primary radio is off and the wake-up radio is active. When the access point has a data packet buffered for the device, the access point can transmit a wake-up trigger frame to the device. The wake-up radio can receive the wake-up trigger frame and the device can decide whether to wake up the primary radio to receive the packet. The wake-up radio typically has a low power consumption, for example, less than 100 microwatts in the active state. By using the wake-up radio, the device can reduce the power consumption. Low power consumption can be important for battery-powered devices, such as wearable devices.

DESCRIPTION OF DRAWINGS

FIG. 4 illustrates a second example wake-up trigger frame including an optional source address according to some implementations.

FIG. 5 illustrates a third example wake-up trigger frame including an optional source address according to some implementations.

FIG. 6 illustrates an example payload bitmap according to some implementations.

FIG. 14 is a flowchart illustrating an example method for processing a wake-up trigger frame according to some implementations.

FIG. 15 is a schematic illustrating an example device according to some implementations.

FIG. 16 is a schematic illustrating an example access point according to some implementations.

Like reference numbers and designations in the various drawings indicate like elements.

DETAILED DESCRIPTION

Figure 1:
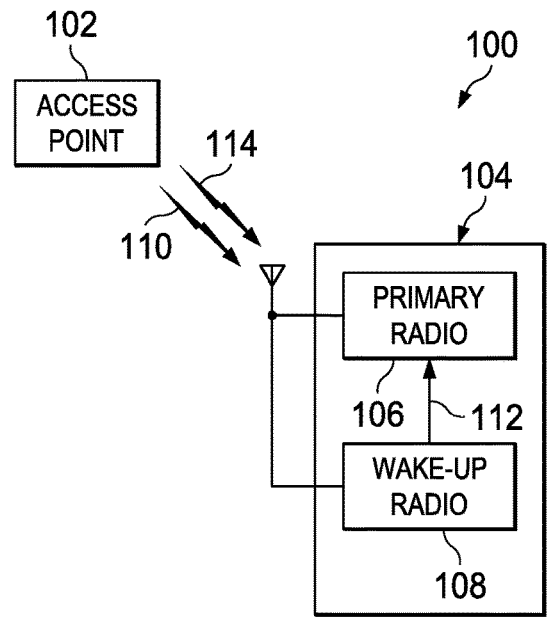
FIG. 1 is an example wireless communication system that includes a wake-up trigger frame according to some implementations.

The present disclosure is directed to types of addresses in a wake-up trigger frame. Various modifications to the disclosed implementations will be readily apparent to those of ordinary skill in the art, and described principles may be applied to other implementations and applications without departing from the scope of the disclosure.

For power saving, devices such as IEEE 802.11 devices can include a primary radio (also called primary connectivity radio), as well as a secondary wake-up radio (WUR). The wake-up radio can be a simple receiver without transmitting functionalities, and the primary radio can have both transmitting and receiving functionalities. The wake-up radio can operate at a low power and trigger the primary radio to wake up. When an access point has data packets or frames buffered for an associated device, the access point can transmit a wake-up trigger frame to the device. The wake-up radio can receive the wake-up trigger frame and the device can decide whether to wake up the primary radio for receiving the data frames. By doing so, the primary radio can be turned on for worthwhile data transfer. On the one hand, waking up the primary radio unnecessarily for unimportant or irrelevant data frames is undesirable. On the other hand, the wake-up radio uses power to decode the wake-up trigger frame and determine whether to wake up the primary radio. Unnecessary power drain can be caused by both waking up the primary radio unnecessarily and by spending too much power deciding not to wake up. A protocol design that balances the two factors is desired.

In existing approaches, the wake-up trigger frame only includes transmitter and receiver identities or addresses. For example, the transmitter identity can be the IEEE 802.11 access point (AP) address, and the receiver identity can be the device or station (STA) address. For providing more information to the device to reduce unnecessary wake-ups, the described approach includes a source address in the wake-up trigger frame. The source address can be the address or identity of the node on the local area network (LAN) or wireless LAN (WLAN) that sent the data frames that are queued at the AP for delivery and caused the AP to send the wake-up trigger frame. For example, in a WLAN where an AP connects to multiple devices, when one device sends data frames to another device through the AP, the AP can include the address of the sending device as the source address and the AP address as the transmitter identity in the wake-up trigger frame. In some implementations, the device can determine whether to wake up the primary radio based on the source address. In some implementations, the wake-up trigger frame can also include contents of the Internet Protocol (IP) header of the data frames such as source address/port, destination address/port and protocol type, and the device can determine whether to wake up based on the contents of the IP header.

For reducing power consumption, the transmitter and receiver identities in the wake-up trigger frame are preferred to have a short length so that the wake-up radio can decode fewer bits and use less power. In existing approaches, an association identifier (AID) of a STA is used as the receiver identity, which identifies individual devices. The described approach describes a group receiver identity for groupcast (such as multicast or broadcast) that can be included in the wake-up trigger frame to wake up a group of devices. In some implementations, the described group receiver identity can have a similar length as, for example, AID.

FIG. 1 is an example wireless communication system 100 that includes a wake-up trigger frame according to some implementations. The example communication system 100 includes an AP 102 and a device 104. The AP 102 can be an IEEE 802.11 AP such as an IEEE 802.11a/b/g/n/ac/ah/ax AP or an AP conforming to other standards. The device 104 can be an IEEE 802.11 device or a device conforming to other standards. The device 104 can include a primary radio 106 (also called primary connectivity radio) and a secondary wake-up radio 108. The wake-up radio 108 can be a simple receiver without any transmission functionality, and the primary radio 106 can have both transmitting and receiving functionalities. In some implementations, the primary radio 106 can be an IEEE 802.11 radio, for example, an IEEE 802.11a/b/g/n/ac/ah/ax radio. The wake-up radio 108 can operate at a low power and trigger the primary radio 106 to wake up. If there is no data transfer, the primary radio 106 is off and the wake-up radio 108 is on. When data frames are buffered at the AP 102 for the device 104, the AP 102 can send a wake-up trigger frame 110 to the device 104. The wake-up radio 108 can decode the wake-up trigger frame 110, and the device 104 can decide whether to wake up the primary radio 106 based on the wake-up trigger frame 110. If the device 104 decides to wake up the primary radio 106, the wake-up radio 108 can send a wake-up signal 112 to turn on the primary radio 106 so that the primary radio 106 can receive data frames 114. The data frames 114 can be transmitted in the same or different frequency band/channel from the wake-up trigger frame 110.

In some implementations, if the data frames 114 are transmitted in different frequency bands/channels from the wake-up trigger frame 110, the AP 102 can have two separate radios, for example, a primary radio to transmit the data frames 114 and a secondary wake-up transmitter or radio to transmit the wake-up trigger frame 110. If the data frames 114 are transmitted in the same frequency band/channel as the wake-up trigger frame 110, the wake-up trigger frame 110 can be transmitted by the primary radio without a separate wake-up transmitter.

In operation, the wake-up radio 104 can receive the wake-up trigger frame 110 from the AP 102, where the wake-up trigger frame 110 can include a group receiver identity. In response to determining that the device 104 is associated with the group receiver identity, the wake-up radio 104 can send a wake-up signal 112 to the primary radio 106 to turn on the primary radio. The wake-up radio 104 can have receiving functionalities, and the primary radio 106 can have both transmitting and receiving functionalities. In some cases, the device 104 can be an IEEE 802.11 device, and the AP 102 can be an IEEE 802.11 access point. The group receiver identity can be used for at least one of multicast or broadcast. The group receiver identity can be a short identity, for example, having a length shorter than a length of a medium access control (MAC) address. In some cases, the group receiver identity can have a same or similar length as an AID. In some implementations, the AP 102 can maintain a list of group receiver identities, and the device 104 can be associated with one or more group receiver identities from the list of group receiver identities, and the device 104 can receive the one or more group receiver identities from the AP 102.

In some implementations, the wake-up trigger frame 110 can include a source address identifying a node sending data to the device 104. The source address can be a MAC address. In some cases, the source address can be included in a payload field or a header of the wake-up trigger frame 110. Based on the source address, the device 104 can determine whether to send the wake-up signal 112 to turn on the primary radio 106. The wake-up trigger frame 110 can also include a transmitter identity. Based on the transmitter identity, the device 104 can determine whether to send the wake-up signal 112 to turn on the primary radio 106.

The addresses in the wake-up trigger frame described herein can enhance a device's power saving by reducing unnecessary wake-ups for the device. FIGS. 2-16 and associated descriptions provide additional details for these implementations.

Turning to a general description of the elements, a device 104 may be referred to, but is not limited to, as a WLAN device or STA, Wi-Fi device, IEEE 802.11 device, IEEE 802.11a/b/g/n/ac/ah/ax device, user equipment, mobile electronic device, user device, mobile station, subscriber station, portable electronic device, mobile communications device, wireless modem, or wireless terminal. Examples of a device 104 may include, but are not limited to, a personal data assistant (PDA), smart phone, laptop, tablet, personal computer (PC), portable computer, portable gaming device, wearable electronic device, test equipment, gambling machine, car/vehicle, notice board, home appliance, sensor, actuator, or other mobile or fixed communications device having components for communicating data with an AP 102 through a wireless link over at least one of an unlicensed spectrum or a licensed spectrum.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate. The described approach may be implemented using other methods or elements consistent with the scope of this disclosure. The described approach can be implemented using one or more chipsets. For example, the primary radio 104 and the wake-up radio 112 can be on one or different chipset. In addition, in some implementations, various steps of flow diagrams and flowcharts in FIGS. 2-14 may be run in parallel, in combination, in loops, or in any order. The field/element length in bits or bytes illustrated in FIGS. 3-11 are example sizes.

Figure 2:
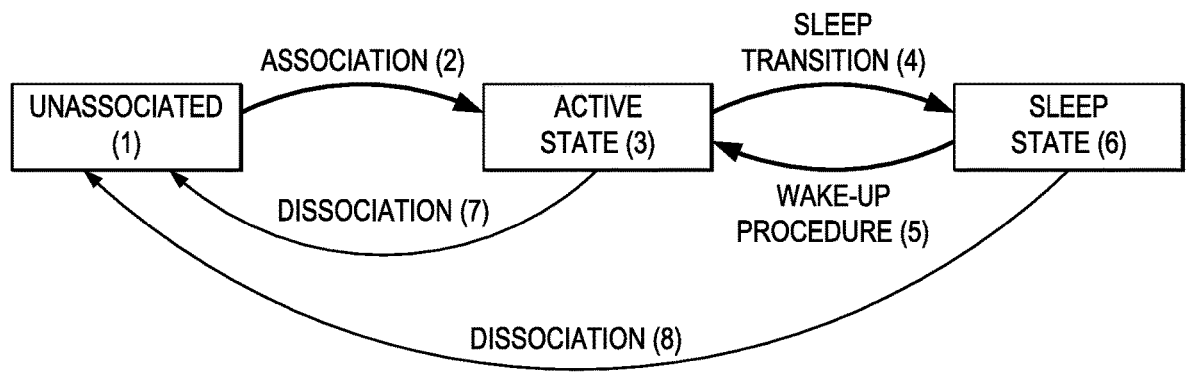
FIG. 2 is a state diagram illustrating state transitions of a device according to some implementations.

FIG. 2 is a state diagram 200 illustrating state transitions of a device according to some implementations. The state diagram 200 includes an unassociated state (1), active state (3), and sleep state (6). In the awake state (3), the STA or device operates using a primary radio such as an IEEE 802.11a, b, g, n, ac, ah, ax radio or similar. In the sleep state (6), the STA powers down the primary radio and operates an alternative low-power radio which may be in the same band/channel or out of band from the primary radio. Typically, the primary radio is not powered up when the device is in the sleep state (6). In some cases, legacy power save modes, such as power save polling (PS-Poll) or unscheduled automatic power save delivery (U-APSD), can be part of the active state (3). In other words, the active state (3) can include IEEE 802.11 awake and doze states. In some implementations, an AP associated with the STA maintains which state the STA is in.

The STA can move from the unassociated state (1) to the active state (3) through an association procedure (2) which associates the STA to an AP. The active state (3) can move to the sleep state (6) through a transition to sleep procedure (4) which can include powering down the primary radio and powering up the wake-up radio. The sleep procedure (4) can be triggered by a timer expiry or other events. The sleep state (6) can move to the active state (3) through a wake-up procedure (5) which can include powering up the primary radio and powering down the wake-up radio. One of the ways the wake-up procedure (5) can be triggered by the AP transmitting a wake-up trigger frame to the STA in the sleep state (6). In some implementations, the wake-up trigger frame is transmitted by the AP using a wake-up transmitter. In some cases, the STA can transition from the sleep state to the active state autonomously without receiving a wake-up trigger frame, or via an out-of-band wake-up trigger. In some cases, the wake-up radio can be on for both the sleep state (6) and the active state (3). The STA can move from either the active state (3) or the sleep state (6) to the unassociated state (1) through a dissociation procedure (7) or (8) which can disassociate the STA from the AP. The state transitions (2), (4), (5), (7), and (8) can involve one or more frames or messages exchanged between the STA and the AP, or be implicit (for example, based on timers). In this disclosure, the term "wake up" in general refers to waking up the primary radio or the STA/device.

Existing designs of the wake-up trigger frame include a transmitter identity (e.g., AP identifier or address) and a receiver identity (e.g., STA identifier or address) in the header of the wake-up trigger frame. For reducing unnecessary wake-ups, an additional field can be included in the wake-up trigger frame to convey a source address. The source address can provide additional information for the device to better determine whether to wake up the primary radio. The source address can correspond to a device on the Ethernet network or a STA on the WLAN that sent data frames for which the wake-up trigger frame was initiated. For example, on a simple LAN/WLAN, when the AP receives data frames from the Internet or external network targeted for a STA, the wake-up trigger frame can have a source address corresponding to the gateway router connected to the Internet or external network. In another example, when the AP connects to multiple STAs, and the AP receives data frames from a source STA for a target STA to receive, the source address in the wake-up trigger frame can correspond to the source STA. As will be discussed in FIGS. 3-8, the source address can be in a header or in a payload of the wake-up trigger frame. In some implementations, the source address can be a MAC address or other type of address.

Figure 3:
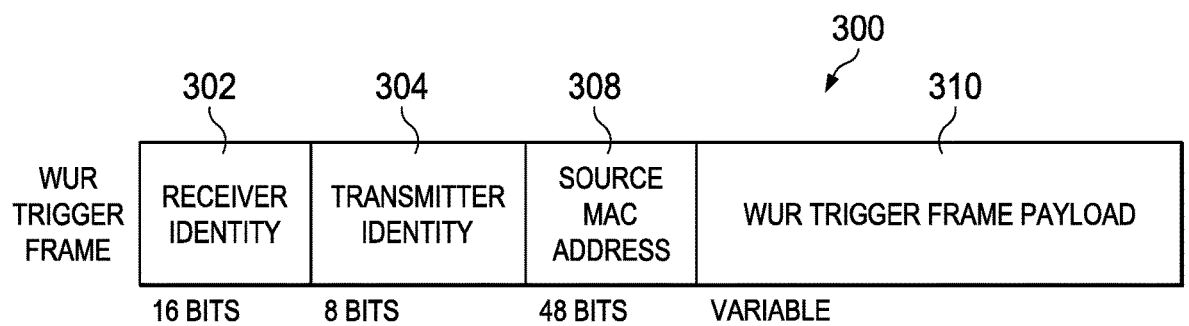
FIG. 3 illustrates a first example wake-up trigger frame including a source address according to some implementations.

FIG. 3 illustrates a first example wake-up trigger frame 300 including a source address according to some implementations. The wake-up trigger frame 300 (also called WUR trigger frame) includes the source address in the frame header. For example, the wake-up trigger frame 300 can have a header including a receiver identity 302, a transmitter identity 304, and a source address 308, as well as a payload 310. The source address 308 can be a MAC address or other type of address identifying a source of the data frames, for example, as discussed above, a gateway router connected to the Internet or an external network or a source STA sending the data frames. In some cases, the source MAC address can be 48 bits or any other length.

For power saving, the wake-up trigger frame is preferred to have a small number of bits so that less power is used when decoding the wake-up trigger frame. The receiver identity 302 can be a short address of the receiving STA, for example, using AID or other identity. As will be discussed below, the receiver identity 302 can also be a group receiver identity for groupcast identifying a group of STAs. The transmitter identity 304 can be a short address of the transmitting AP, for example, using basic service set (BSS) color code or other identity.

In some implementations, the source address can be in the payload of the wake-up trigger frame. In some cases, the source address can be an optional field of the payload. The fact whether the source address field is present or not can be indicated, for example, via a bitmap.

FIG. 4 illustrates a second example wake-up trigger frame 400 including an optional source address according to some implementations. The wake-up trigger frame 400 can have a header including a receiver identity 302 and a transmitter identity 304, as well as a payload 402. The payload 402 can have a variable length and may or may not include the source address.

FIG. 5 illustrates a third example wake-up trigger frame 500 including an optional source address according to some implementations. The wake-up trigger frame 500 can include an optional source address in the payload, and a payload bitmap can be used to indicate whether the source address is present or not. For example, the wake-up trigger frame 500 can have a header, including a receiver identity 302 and a transmitter identity 304. The payload of the wake-up trigger frame 500 can include a payload bitmap 502 to indicate which fields are present in the payload (an example of the payload bitmap 502 is shown in FIG. 6), a source address 504 if the payload bitmap 502 indicates that the source address is present (for example, bit 602 in FIG. 6 indicates that the source address is present), and other payload fields 506 and 508. In some cases, the payload bitmap 502 can have 16 bits or any other length.

In some implementations, additional to or instead of the source address, information from an IP layer, for example, fields from the transmission control protocol (TCP)/IP or user datagram protocol (UDP)/IP header of the data frames, can be conveyed in the wake-up trigger frame. The header can include the source and destination IP address, Differentiated Services Code Point (DSCP), IPv6 flow information, UDP or TCP source and destination ports, and the protocol type field (found in the IPv4 Protocol field or IPv6 next header field). One or more of these fields may be included in the wake-up trigger frame. In some cases, a hash of the compressed form of some or all of the TCP/IP or UDP/IP header can be included in the wake-up trigger frame.

FIG. 6 illustrates an example payload bitmap 600 according to some implementations. The payload bitmap 600 is a list of flags to indicate whether a particular field is present in the payload of the wake-up trigger frame, which is an efficient way (low overhead) to indicate a plurality of optional fields with fixed or short content lengths. For example, the payload bitmap 600 uses 16 bits of which some are defined explicitly and others are reserved for future extensibility (for example, bits 622). The payload bitmap 600 can use one bit 602 to indicate whether the source address is present in the payload, and use bits 608, 610, 612, 614, 616, 618, and 620 to indicate whether the payload includes the source and destination IP address, DSCP code point, IP flow information, source and destination port, and IP protocol type, respectively. In some implementations, the payload bitmap 600 can also use bits 604 and 606 to indicate if the payload includes Ethernet protocol type and vendor specific information, respectively. The bit 604 enables the wake-up trigger frame to specify different Ethernet protocol types for accommodating non-IP traffic.

Figure 7:
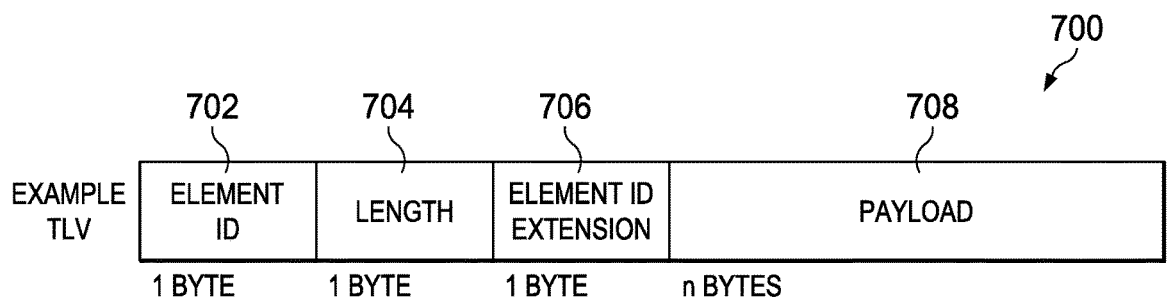
FIG. 7 illustrates an example type-length-value (TLV) element according to some implementations.

In some implementations, instead of using a payload bitmap, a type-length-value (TLV) frame structure can be used to encode optional elements such as source address and IP layer information. FIG. 7 illustrates an example TLV element 700 according to some implementations. For example, the TLV element 700 can include an element identifier 702, a length field 704, an element identifier extension 706, and a TLV payload 708. In some cases, the length field 704 can indicate the length of the TLV payload 708.

Figure 8A:
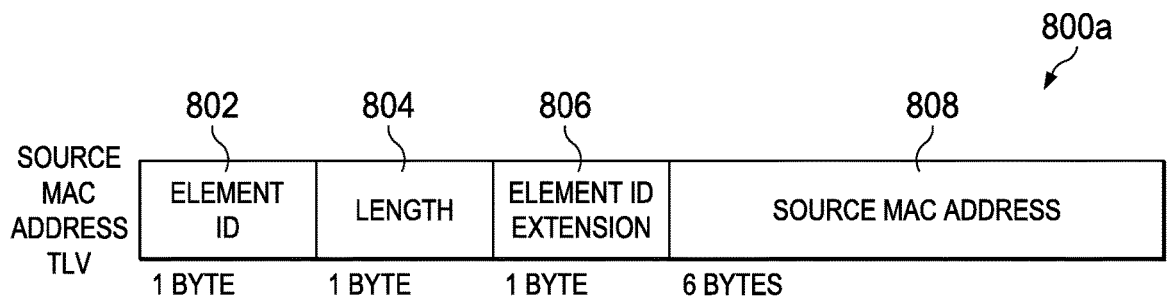
FIG. 8A illustrates an example TLV element including a source address according to some implementations.

FIG. 8A illustrates an example TLV element 800a including a source address according to some implementations. The TLV element 800a can include an element identifier 802 indicating a source address TLV, a length field 804, an element identifier extension 806, and a TLV payload 808 including the source address. The source address TLV element 800a can be included in the trigger frame payload 402 in FIG. 4.

Figure 8B:
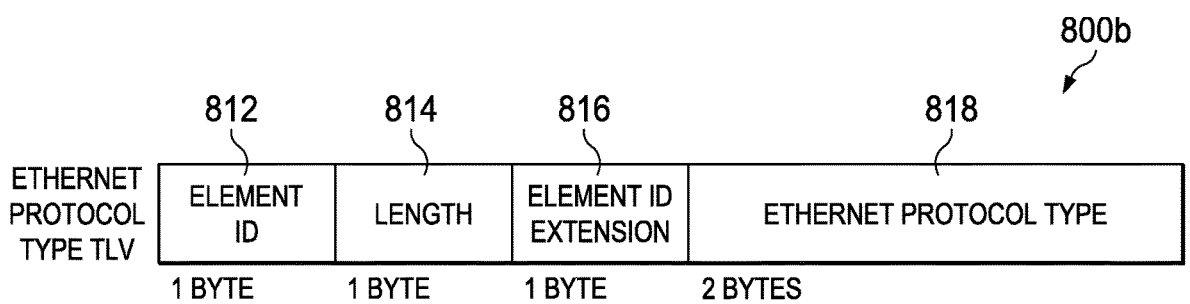
FIG. 8B illustrate an example TLV element including an Ethernet protocol type according to some implementations.

FIG. 8B illustrate an example TLV element 800b including an Ethernet protocol type according to some implementations. The TLV element 800b can include an element identifier 812 indicating an Ethernet protocol type TLV, a length field 814, an element identifier extension 816, and a TLV payload 818 including the Ethernet protocol type information. In some cases, the Ethernet protocol type in the payload 818 can be abbreviated to EtherType. The Ethernet protocol type TLV element 800b can be included in the trigger frame payload 402 in FIG. 4.

Figure 9A:
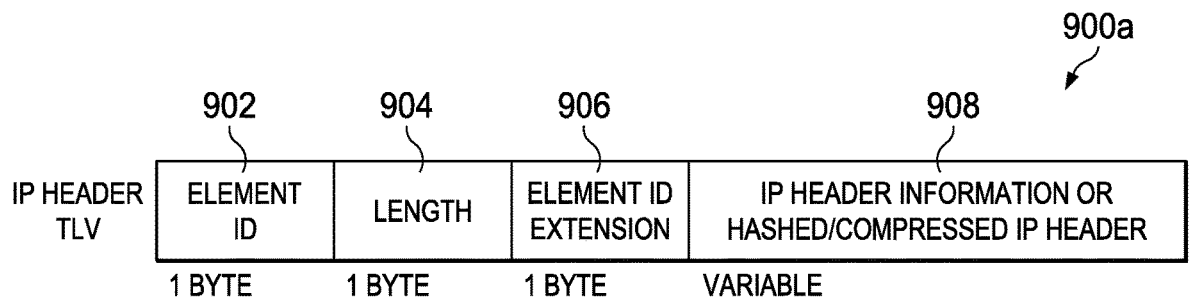
FIG. 9A illustrates an example TLV element including Internet Protocol (IP) layer information according to some implementations.

FIG. 9A illustrates an example TLV element 900a including IP layer information according to some implementations. The TLV element 900a can include an element identifier 902 indicating an IP header TLV, a length field 904, an element identifier extension 906, and a TLV payload 908 including IP header information or hashed/compressed IP header. The IP header TLV element 900a can be included in the trigger frame payload 402 in FIG. 4.

Figure 9B:
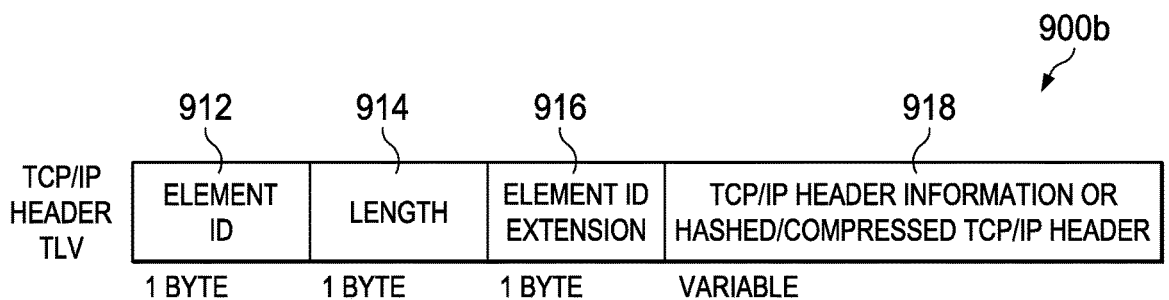
FIG. 9B illustrates an example TLV element including transmission control protocol (TCP)/IP header information according to some implementations.

FIG. 9B illustrates an example TLV element 900b including TCP/IP header information according to some implementations. The TLV element 900b can include an element identifier 912 indicating a TCP/IP header TLV, a length field 914, an element identifier extension 916, and a TLV payload 918 including TCP/IP header information or hashed/compressed TCP/IP header. The TCP/IP header TLV element 900b can be included in the trigger frame payload 402 in FIG. 4.

Figure 9C:
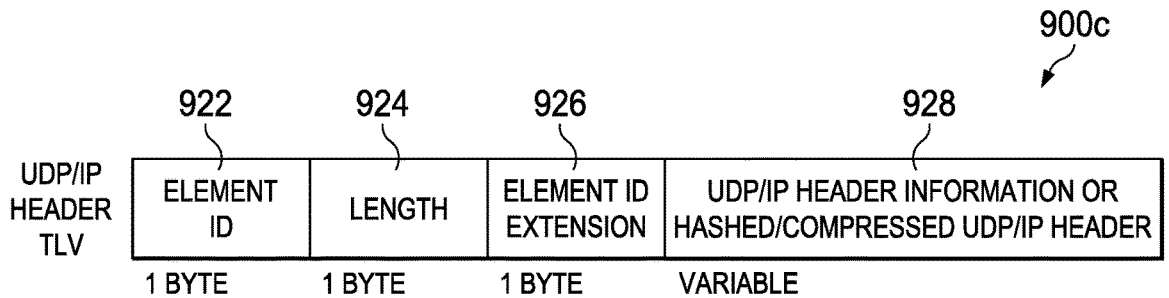
FIG. 9C illustrates an example TLV element including user datagram protocol (UDP)/IP header information according to some implementations.

FIG. 9C illustrates an example TLV element 900c including UDP/IP header information according to some implementations. The TLV element 900c can include an element identifier 922 indicating a UDP/IP header TLV, a length field 924, an element identifier extension 926, and a TLV payload 928 including UDP/IP header information or hashed/compressed UDP/IP header. The UDP/IP header TLV element 900c can be included in the trigger frame payload 402 in FIG. 4.

Figure 10:
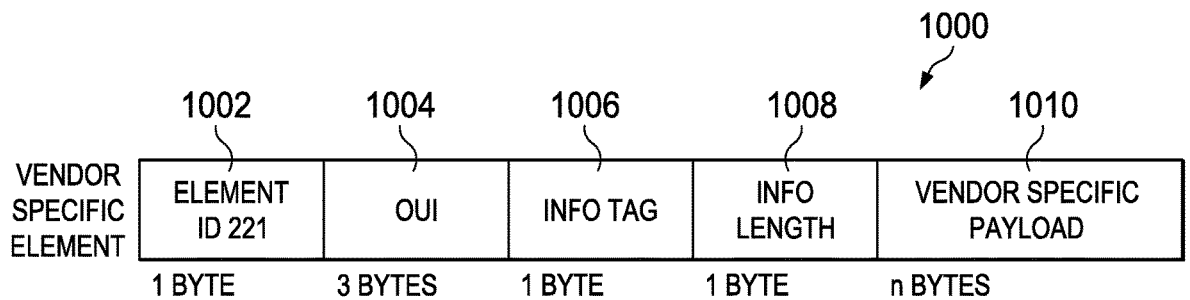
FIG. 10 illustrates an example TLV element including vendor specific information according to some implementations.

FIG. 10 illustrates an example TLV element 1000 including vendor specific information according to some implementations. The TLV element 1000 can include an element identifier 1002 indicating a vendor specific element TLV, an organizational unique identifier (OUI) 1004, an information tag field 1006, an information length field 1008, and a TLV payload 1010 including the vendor specific information. The OUI 1004 can be a 24-bit number registered with the IEEE registration authority (RAC). The vendor specific TLV element 1000 can be included in the trigger frame payload 402 in FIG. 4.

In some implementations, the STA can request or negotiate with the AP to include the source address in the wake-up trigger frame. For example, the STA can negotiate with the AP during the association process where the STA associates with the AP, during the sleep process where the STA goes from the active state into the sleep state, or at any other time.

In some cases, the wake-up trigger frame can be addressed to a group of STAs where the receiver identity in the trigger frame can be a group identity. The group addressed trigger frame can wake up a group of STAs to receive groupcast information. Groupcast can include multicast and broadcast. Broadcast transmits information to all nodes on a network or subnetwork. Multicast transmits information to a subset of all nodes on a network, where the subset can have zero, one, a number, or all of the nodes on the network.

In some implementations, the AP can include the source address in group addressed trigger frames (i.e., wake-up trigger frames with a group receiver identity), but not for individually addressed trigger frames (i.e., wake-up trigger frames with an individual receiver identity). In some cases, the groupcast information is likely to be unimportant information, and providing the source address in the trigger frame can help individual STA to make a better decision whether to wake up the primary radio or not.

Figure 11:
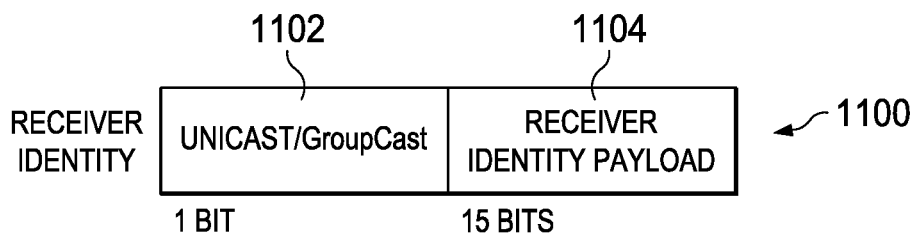
FIG. 11 illustrates a receiver identity in a wake-up trigger frame according to some implementations.

FIG. 11 illustrates a receiver identity 1100 in a wake-up trigger frame according some implementations. The receiver identity 1100 can be used in the receiver identity 302 in FIGS. 3-5. The receiver identity 1100 can include a unicast/groupcast field 1102 and a receiver identity payload 1104. The unicast/groupcast field 1102 indicates whether the receiver identity payload 1104 includes an individual receiver identity for unicast or a group receiver identity for groupcast. As shown in FIG. 11, the unicast/groupcast field can be part of the receiver identity. In some implementations, the unicast/groupcast field can be in a separate field from the receiver identity. In some cases, the unicast/groupcast field can include multiple bits, for example, to further distinguish between multicast and broadcast within the category of groupcast by using a second bit or flag.

Figure 12:
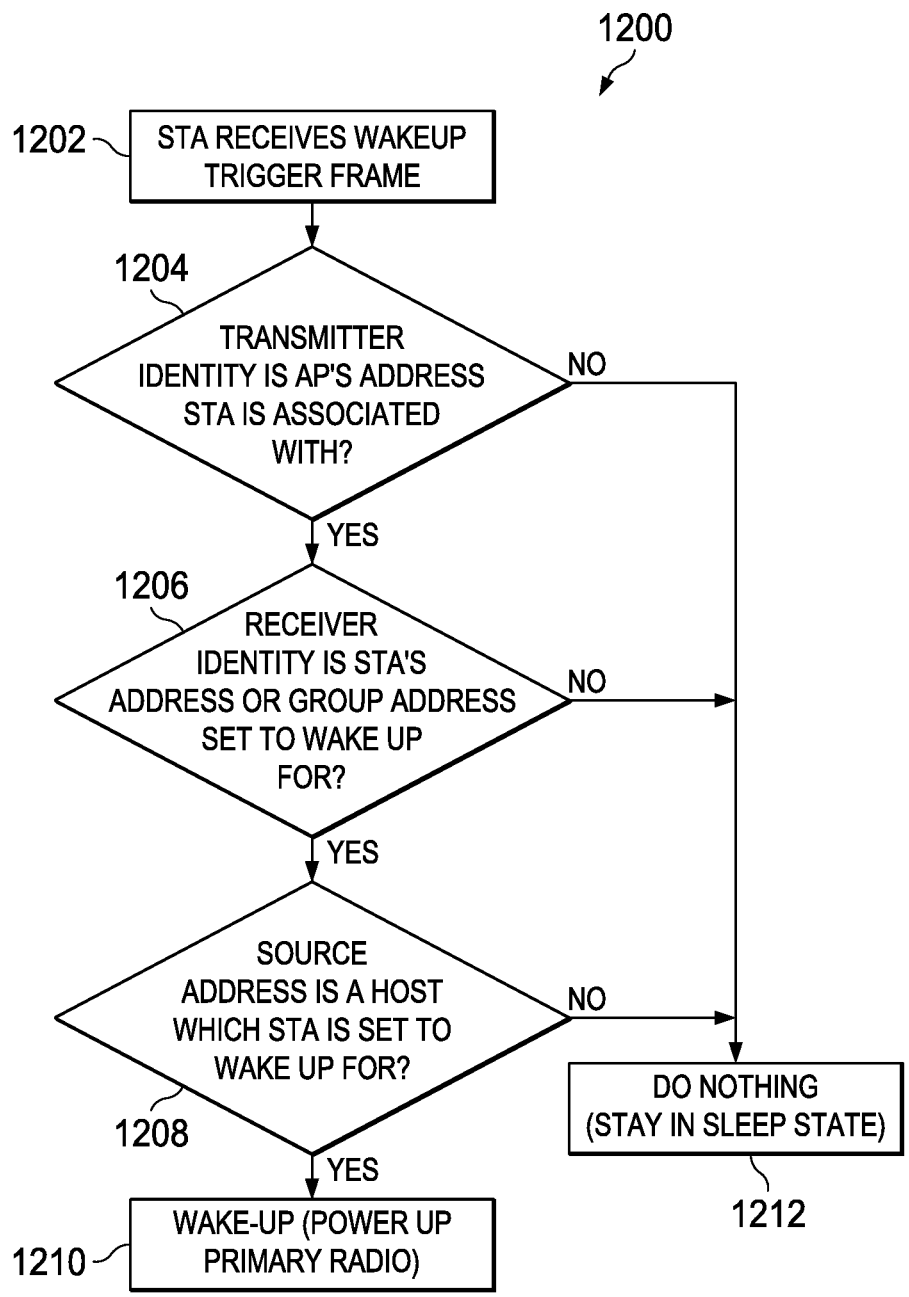
FIG. 12 is a first flow diagram illustrating an example method for processing a wake-up trigger frame according to some implementations.

FIG. 12 is a first flow diagram illustrating an example method 1200 for processing a wake-up trigger frame according to some implementations. The operation in the method 1200 occurs in a WUR-enabled STA that is in the sleep state (6) of FIG. 2. The method 1200 shows the operation in the STA after receiving a wake-up trigger frame. The method 1200 includes an implementation of the wake-up procedure (5) of FIG. 2 that can have two outcomes: the STA transitions to the active state, or the STA remains in the sleep state.

The method 1200 starts at block 1202 where a STA in a sleep state receives a wake-up trigger frame. The trigger frame can be received by the wake-up radio of the STA. The wake-up trigger frame can include the source address, the transmitter identity (or address), and the receiver identity (or address) as described in FIGS. 3-6, 8, and 11.

At block 1204, the STA can compare the transmitter identity in the trigger frame to the address of the AP to which the STA is associated. The transmitter identity in the trigger frame can be a short identifier of the AP such as a BSS color code or a truncated or hashed identifier. If the transmitter identity matches the AP identifier/address, the STA continues to process the trigger frame and the method 1200 proceeds to block 1206. If the transmitter identity does not match the AP identifier/address, the method 1200 proceeds to block 1212 where the STA remains in the sleep state.

At block 1206, the STA can compare the receiver identity in the trigger frame to the STA's own address or the group receiver identities the STA is associated with. For example, as will be discussed below, the STA can have a number of multicast and broadcast groups that the STA intends to wake up for, and the STA can store the corresponding group receiver identities. The STA can determine whether the receiver identity is a unicast or groupcast identity, for example, based on the unicast/groupcast field 1102 of FIG. 11. In some cases, the unicast receiver identity can be a short address of the receiving STA, such as an AID or a truncated or hashed identifier. If the receiver identity is a unicast identity matching the STA's address, the STA continues to process the trigger frame and the method 1200 proceeds to block 1208. If the unicast receiver identity does not match the STA's address, the method 1200 proceeds to block 1212 where the STA remains in the sleep state. Similarly, if the receiver identity is a group receiver identity matching a group identity that the STA is associated with, the STA continues to process the trigger frame and the method 1200 proceeds to block 1208. If the group receiver identity does not match a group identity that the STA is associated with, the method 1200 proceeds to block 1212 where the STA remains in the sleep state.

At block 1208, the STA can read the source address in the trigger frame. As described in FIGS. 3-6 and 8, the source address can be a source MAC address in the header or the payload of the trigger frame. In some implementations, the STA can maintain a whitelist and/or a blacklist for the source address. The STA can compare the source address with the blacklist, and if there is a match the method 1200 proceeds to block 1212 where the STA remains in the sleep state. The STA can also compare the source address with the whitelist, and if there is a match the method 1200 proceeds to block 1210 where the STA transitions to the active state and powers up the primary radio. In some cases, if the source address matches neither the blacklist nor the whitelist, the STA can either remain in the sleep state or transition to the active state, for example, depending on how aggressively the STA saves power.

Examples for the whitelist or blacklist can include treating data frames from the gateway router different from data frames from another device internal to the network. Another example is that certain chatty neighbors may be blacklisted or temporarily blacklisted. For example, the blacklist can be changing dynamically based on local environmental parameters. In yet another example, the STA is a single-purpose device that can whitelist a single source Ethernet address corresponding to the one server on the network the STA expects or allows to wake it up.

At block 1208, if the source address is not present in the trigger frame, the STA may remain in the sleep state or transition to the active state. The STA behavior when the source address is not present can be hard coded or based on a dynamic set of criteria determining how aggressive at saving power the STA is. For example, if the STA is plugged into a charger without any power limitation, the STA can enter the active state. However, if the STA has a low battery and is programmed to aggressively save power, the STA can remain in the sleep state.

In some cases, as discussed in FIGS. 6 and 9, the trigger frame can include IP header information of the data frames. The STA can maintain a whitelist and/or a blacklist for the IP address and/or port. If the trigger frame includes the IP header information, the method 1200 can further include the STA comparing the IP header information with the whitelist and/or blacklist. For example, a whitelist can be generated in the STA based on the currently open sockets. One way to do this is that when going to sleep, the primary radio network stack makes available to the wake-up radio information about the open sockets such that the wake-up radio can construct IP header information for these sockets (including IP address, DSCP value, Flow number, port and protocol). If the IP header information in the trigger frame does not match an open socket (i.e., the trigger frame is for opening a new IP connection, or contains connectionless broadcast information), the STA can remain in the sleep state and save battery power for the active connection(s). In other words, the STA can receive data frames sent in sockets that are in the open state (for example to receive downlink "pushed" messages), but not allow new sockets to be opened by the remote host. This is suitable for some device applications and enables the device to save power by preventing unwanted network traffic from waking up the device.

In some implementations, the STA can negotiate wake-up trigger parameters with the AP while the STA is in the active state (for example, using a frame exchange). The AP can transmit the wake-up frame either without any header information, or with the information that triggered the wake-up frame to be sent. For example, the STA and the AP can operate as follows:

1. While the STA is in the active state, the STA can transmit a set of conditional information to the AP including header types and values that would be used as a filter.
2. The AP can process the message from the STA, and store the filter information.
3. The STA goes to the sleep state.
4. For every incoming frame for the STA (or a group of STAs), the AP can compare the frame to the filter list. If there is a match, then the AP issues a wake-up frame to the STA (optionally including the information that matched the filter). For these cases, block 1208 can be generalized to determine whether a wake-up condition matches any negotiated filter.

The receiver identity in the trigger frame can be a group receiver identity for groupcast identifying a group of STAs. For reducing the number of bits in the wake-up trigger frame so that the STA can spend less power to decode the trigger frame, a short group receiver identity, for example, shorter than the 48-bit MAC address or having a same or similar length as the AID for unicast, is desirable. In some implementations, groupcast IPv4/IPv6 addresses and groupcast IEEE MAC addresses can be translated to short addresses and used in the trigger frame.

In some implementations, a STA that is transitioning to a sleep state or plans to go to a sleep state in future, can provide the AP with a list of group addresses (e.g., group MAC addresses) to which the STA is interested in being triggered to wake. The AP maintains a table of these group MAC addresses (from one or more WUR-enabled STAs) and generates a short address for each of the group MAC addresses. The AP can notify the STA of the short addresses for the list of group MAC addresses that the STA is interested in. If multiple STAs subscribe to the same group MAC address, these STAs can be assigned the same short address. The AP then uses this short address as the receiver identity in the trigger frame for any downlink data frames the AP receives that are addressed to the associated group MAC address. In some cases, STAs may update their groupcast subscriptions to the AP periodically. The AP can manage the table of group MAC addresses to short addresses periodically in response to timeouts, STAs associating, and STAs dissociating, and notify the STA of any change in the mapping of the group MAC addresses to the short addresses.

In some cases, both the AP and the STA can maintain a mapping table of group MAC addresses to short addresses. The mapping table at the STA can be a subset of the mapping table at the AP. Messages can be exchanged between the AP and the STA so that the mapping tables are synchronized at the AP and the STA. For example, in FIG. 2, the messages can be exchanged during the association (2), in the active state (3), during the sleep transition (4), in the sleep state (6) using management frames transmitted by the wake-up radio, or at other times. For instance, the AP can inform STAs that are transitioning to the sleep state of the full current mapping table of short addresses for multicast groups. The STA can also send a request to the AP for the subset of the short group addresses the STA is interested in waking up for. When receiving a wake-up trigger frame, the STA can compare the group receiver identity in the trigger frame with the stored short group addresses and decide whether to wake up the primary radio.

In some implementations, AID-based short addresses can be used for unicast, and the short addresses for groupcast can have a similar or same length as the AID-based short addresses. For example, the AP can use a 16-bit address as the receiver identity in the wakeup trigger frame. The 16-bit address can include 12-bit AID (e.g., for 802.11ax STAs) or 13-bit AID (e.g., for 802.11ah STAs) for unicast, and provide an address space for multicast groups and broadcast addresses. The AP can maintain a table of MAC addresses (48 bits) to the 16-bit shorter addresses. For unicast addresses this can be the same as the AID to MAC table of clients that an AP would already maintain. For example, the AP can maintain a mapping table similar to Table 1.

TABLE 1

Mapping of 48-bit MAC addresses to short 16-bit addresses

| 48-bit address | 16-bit address |
|---|---|
| MAC address unicast | 000 + AID13 (802.11ah) |
| MAC address unicast | 0000 + AID12 (802.11ax) |
| MAC address multicast | 100 + 13 bit assignment for multicast |
| MAC address broadcast | 110 + 13 bit assignment for broadcast |

As shown in Table 1, a short flag prefix is inserted before the 12-bit or 13-bit address or identity. For example, zeros are inserted before the AID for unicast, while short addresses for multicast can include a prefix 100 and a 13-bit group address and short addresses for broadcast have a prefix 110. Multicast and broadcast can have different prefixes and maintain two different address spaces, or can have a single prefix and be assigned from the same address space. When the AP receives data frames addressed to a 48-bit MAC address, the AP can look up the mapping table (such as Table 1), find the corresponding short address, and use the short address as the receiver identity in the trigger frame.

A small number of IPv4 and IPv6 group addresses (for uPNP, bonjour, ipv6 neighbor discovery etc.) are well-known and commonly used in LANs and WLANs for local network management protocols. Translation of IPv4 and IPv6 group addresses to IEEE MAC addresses via IETF RFC 1112 results in the same small number of MAC addresses being commonly used. Internet Group Management Protocol (IGMP) and other upper layer protocols determine/negotiate groupcast at the IP layer, but traditionally the AP is transparent to the upper layer protocols and deliver incoming frames to the specified MAC addresses.

The small number of commonly used group addresses (for uPNP, bonjour, ipv6 ND etc.) can be pre-populated in the mapping table(s) at the AP and/or the STA. For example, a certain set can be prepopulated (for example, 10 or 20 MAC addresses to short addresses) at the AP and any group addresses beyond the set can be added by the AP based on STAs' subscriptions. The pre-populated set can be specified in a standard and implemented consistently into APs and/or STAs. In some cases, the prepopulated set can be a list pre-populated into APs and transmitted to STAs at the association time, ahead of transition to the sleep state, in the active state, or at other times. For example, commonly used group addresses can be preloaded or reserved as shown in Table 2. The behavior of the network management protocols associated with these commonly used group addresses is well understood and STAs can make informed decisions about whether to wake up for such protocols or not.

TABLE 2

Mapping of commonly used group MAC addresses to short 16-bit addresses

| 48-bit address | 16-bit address | Commonly used by: |
|---|---|---|
| 01:00:5E:00:00:FB | 010 00000 0000 0001 | IPv4 Bonjour |
| FF:FF:FF:FF:FF:FF | 010 00000 0000 0010 | IPv4 ARP |
| 33-33-00-00-00-01 | 011 00000 0000 0001 | IPv6 Neighbour Advertisement |
| 33-33-00-00-00-02 | 011 00000 0000 0010 | IPv6 Router Solicitation |
| 33:33:00:00:00:FB | 011 00000 0000 0011 | IPv6 Bonjour |

In some implementations, interaction with the IGMP protocol on a combined AP/router/switch device or network controller can be used to optimize and manage the multicast short addresses, for example, to flush out addresses that are no longer used. The AP can dynamically add and remove addresses from the mapping table.

The STA can maintain its own short address for unicast which can be based on the AID the STA already was assigned, and any short group addresses that the STA intends to wake-up for. In some cases, the STA may use a certain multicast protocol whilst in the active state, but not want to wake up for that same protocol in the sleep state. For example, if the STA does not want to wake up for bonjour messages in the sleep state, the STA can detect wake-up trigger frames with the bonjour group address and not wake up.

Figure 13:
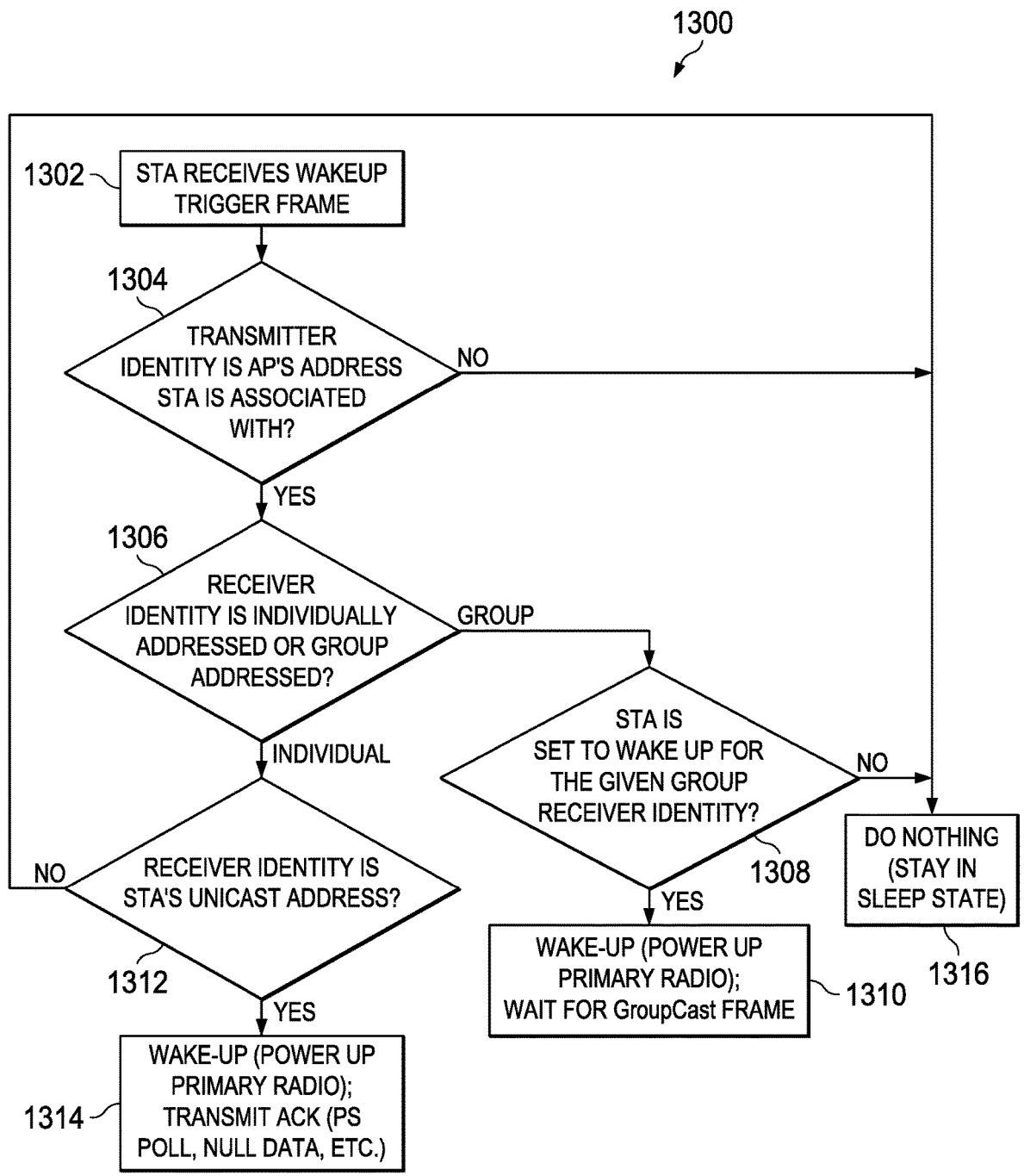
FIG. 13 is a second flow diagram illustrating an example method for processing a wake-up trigger frame according to some implementations.

FIG. 13 is a second flow diagram illustrating an example method 1300 for processing a wake-up trigger frame according to some implementations. The operation in the method 1300 occurs in a WUR-enabled STA that is in the sleep state (6) of FIG. 2. The method 1300 shows the operation in the STA after receiving a wake-up trigger frame. The method 1300 includes an implementation of the wake-up procedure (5) of FIG. 2 that can have two outcomes: the STA transitions to the active state, or the STA remains in the sleep state. Note that for groupcast data frames the STA may temporarily enter the active state to receive one or more data frames followed by returning to the sleep state after a successful reception or a timer expiry. In some cases, the transition to the active state involves transmitting DATA, POLL or ACK frames, but in other cases it can consist of receive-only operation (in this case, the STA may acknowledge the AP that it has entered the active state). For example, STAs using WUR power saving may need to occasionally wake up and respond to network layer messages (such as IPv6 neighbor discovery protocols, address resolution protocol (ARP), bonjour) in order to maintain full connectivity to the other devices on the network.

The method 1300 starts at block 1302 where a STA in a sleep state receives a wake-up trigger frame. The trigger frame can be received by the wake-up radio of the STA.

At block 1304, the STA compares the transmitter identity in the trigger frame to the address of the AP to which the STA is associated. If the transmitter identity matches the AP address, the STA continues to process the trigger frame and the method 1300 proceeds to block 1306. If the transmitter identity does not match the AP address, the method 1300 proceeds to block 1316 where the STA remains in the sleep state.

At block 1306, the STA determines whether the receiver identity in the trigger frame is for unicast or groupcast. The STA can determine unicast or groupcast based on the first few bits of the receiver identity. For example, the unicast/groupcast field 1102 in FIG. 11 can be used to determine unicast or groupcast. Similarly, as shown in Tables 1 and 2, a receiver identity is a unicast receiver identity if the first three bits are all zero and a group receiver identity if the first three bits are 100, 010, or 011. In some cases, the group receiver identity can further indicate the type of groupcast, for example, multicast or broadcast. As shown in Tables 1 and 2, the group receiver identity is for broadcast if the first three bits are 010 or 011, and for multicast if the first three bits are 100. If the receiver identity is a unicast receiver identity, the method 1300 proceeds to block 1312. If the receiver identity is a group receiver identity, the method 1300 proceeds to block 1308.

At block 1308, the STA compares the receiver identity which is a group receiver identity with a whitelist or a blacklist. For example, the STA can maintain a whitelist and/or a blacklist for the groupcast addresses, where the whitelist can include a list of groupcast addresses that the STA intends to wake up for, and the blacklist can include a list of groupcast addresses that the STA does not want to wake up for. If the group receiver identity matches to the whitelist, the method proceeds to block 1310 where the STA wakes up the primary radio to receive groupcast data frames. If the group receiver identity matches to the blacklist, the method proceeds to block 1316 where the STA remains in the sleep state. In some cases, if the group receiver identity does not match the blacklist, the STA proceeds to wake up the primary radio. If the group receiver identity does not match the whitelist, the STA remains in the sleep state. In some cases, the whitelist or blacklist can be a range of addresses instead of a list of addresses. The STA can also make the decision to wake up based on the type of group address being either multicast or broadcast, for example, waking up for multicast, but not broadcast.

At block 1312, the STA compares the receiver identity which is a unicast receiver identity with the STA's own address, for example, the STA's AID. If the unicast receiver identity matches the STA's AID, the method 1300 proceeds to block 1314 where the STA wakes up the primary radio to transmit an acknowledgement to the AP, for example, PS-Poll, null data, etc. If the unicast receiver identity does not match the STA's AID, the method 1300 proceeds to block 1316 where the STA remains in the sleep state.

In some implementations, if the trigger frame includes a source address as shown in FIGS. 3-6 and 8, the STA can further compare the source address with a whitelist or a blacklist for source addresses and determines whether to wake up. For example, the STA can maintain a whitelist and/or a blacklist for source addresses for unicast and/or groupcast.

FIG. 14 is a flowchart illustrating an example method 1400 for processing a wake-up trigger frame according to some implementations. The method 1400 starts at block 1402 where a wake-up radio of a STA receives a wake-up trigger frame from an AP. The STA can be associated with the AP using an association procedure as described in FIG. 2. The wake-up trigger frame can include a receiver identity, a transmitter identity, a source address, and other information as described in FIGS. 3-11. The transmitter identity can include a short address of the AP, for example, BSSID. The source address can be a MAC address of the node on the WLAN/LAN that sends data frames to the STA for which the wake-up trigger frame was initiated. The receiver identity can be a unicast receiver identity or a group receiver identity. The unicast receiver identity can include a short address of the STA, for example, the STA's AID assigned by the associated AP. The group receiver identity can include a short group address for a multicast or broadcast group. The AP can maintain a mapping table of group MAC addresses to short group addresses for each multicast or broadcast group. The STA can identify a set of multicast or broadcast groups that the STA is interested to wake up for, and the AP can inform the STA of the short group addresses for these groups.

At block 1404, based on the receiver identity, the transmitter identity, and the source address in the trigger frame, the STA can decide whether to wake up, for example, as described in FIGS. 12 and 13. If the STA decides to wake up, the wake-up radio can send a signal to a primary radio of the STA to turn on the primary radio.

FIG. 15 is a schematic illustrating an example device 1500 according to some implementations. The example device 1500 includes a processing unit 1502, a computer-readable storage medium 1504 (for example, ROM or flash memory), a wireless communication subsystem 1506, an interface 1508, and an I/O interface 1510. The processing unit 1502 can include one or more processing components (alternatively referred to as "processors" or "central processing units" (CPUs)) configured to execute instructions related to one or more of the processes, steps, or actions described above in connection with one or more of the implementations disclosed herein. The processing unit 1502 can also include other auxiliary components, such as random access memory (RAM) and read-only memory (ROM). The computer-readable storage medium 1504 can be embodied by a non-transitory medium configured to store an operating system (OS) of the device 1500 and various other computerexecutable software programs for performing one or more of the processes, steps, or actions described above.

The wireless communication subsystem 1506 may be configured to provide wireless communications for data information or control information provided by the processing unit 1502. The wireless communication subsystem 1506 can include, for example, one or more antennas, a receiver, a transmitter, a local oscillator, a mixer, and a digital signal processing (DSP) unit. In some implementations, the subsystem 1506 can support multiple input multiple output (MIMO) transmissions. In some implementations, the receivers in the wireless communication subsystems 1506 can be an advance receiver or a baseline receiver. Two receivers can be implemented with identical, similar, or different receiver processing algorithms. The wireless communication subsystem 1506 can include a primary radio and a wake-up radio.

The user interface 1508 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 1510 can include, for example, a universal serial bus (USB) interface. A skilled artisan will readily appreciate that various other components can also be included in the example device 1500.

FIG. 16 is a schematic illustrating an example access point 1600 according to some implementations. The illustrated access point 1600 includes a processing module 1602, a wired communication sub system 1604, and a wireless communication sub system 1606. The wireless communication subsystem 1606 can receive data traffic and control traffic from devices. In some implementations, the wireless communication subsystem 1606 may include a receiver and a transmitter. The wireless communication subsystem 1606 can include a primary radio and a wake-up radio. The processing module 1602 can include one or more processing components (alternatively referred to as "processors" or "central processing units" (CPUs)) capable of executing instructions related to one or more of the processes, steps, or actions described above in connection with one or more of the implementations disclosed herein. The processing module 1602 can also include other auxiliary components, such as random access memory (RAM), read only memory (ROM), secondary storage (for example, a hard disk drive, flash memory or other non-transitory storage medium). The processing module 1602 can execute certain instructions and commands to provide wireless or wired communication, using the wired communication subsystem 1604 or a wireless communication subsystem 1606. Various other components can also be included in the access point 1600.

While operations are depicted in the drawings in a particular order, this should not be understood as requiring that such operations be performed in the particular order shown or in sequential order, or that all illustrated operations be performed to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

The invention claimed is:

1. A method comprising:
   receiving, at a wake-up radio of a device and from an access point, a wake-up trigger frame, wherein the wake-up trigger frame includes an identity;
   determining whether the identity in the wake-up trigger frame is a unicast receiver identity or a group receiver identity;
   in response to determining that the identity in the wake-up trigger frame is the group receiver identity, comparing the group receiver identity with a whitelist, wherein the whitelist comprises a plurality of groupcast addresses that the device intends to wake up for; and
   in response to determining that the group receiver identity matches to one of the plurality of groupcast addresses in the whitelist, sending a signal to a primary radio of the device to turn on the primary radio.

2. The method of claim 1, wherein the wake-up radio includes receiving functionalities, and the primary radio includes both transmitting and receiving functionalities.

3. The method of claim 1, wherein the device is an IEEE 802.11 device, and the access point is an IEEE 802.11 access point.

4. The method of claim 1, wherein the group receiver identity is used for at least one of multicast or broadcast.

5. The method of claim 1, wherein the group receiver identity has a length shorter than a length of a medium access control (MAC) address.

6. The method of claim 1, wherein the access point maintains a list of group receiver identities, wherein the device is associated with one or more group receiver identities from the list of group receiver identities, and the device receives the one or more group receiver identities from the access point.

7. The method of claim 1, wherein the wake-up trigger frame further includes an address identifying a node sending data to the device.

8. The method of claim 7, wherein the address is based on a MAC address.

9. The method of claim 7, wherein the address is included in at least one of a payload field of the wake-up trigger frame or a header of the wake-up trigger frame.

10. The method of claim 7, the method further comprising:
    based on the address, determining whether to send the signal to turn on the primary radio.

11. The method of claim 1, wherein the wake-up trigger frame further includes a transmitter identity, and the method further comprises:

based on the transmitter identity, determining whether to send the signal to turn on the primary radio.

12. A device, comprising:
a memory; and
at least one hardware processor communicatively coupled with the memory and configured to:
receive, at a wake-up radio of the device and from an access point, a wake-up trigger frame, wherein the wake-up trigger frame includes an identity;
determine whether the identity in the wake-up trigger frame is a unicast receiver identity or a group receiver identity;
in response to determining that the identity in the wake-up trigger frame is the group receiver identity, compare the group receiver identity with a whitelist, wherein the whitelist comprises a plurality of groupcast addresses that the device intends to wake up for; and
in response to determining that the group receiver identity matches to one of the plurality of groupcast addresses in the whitelist, send a signal to a primary radio of the device to turn on the primary radio.

13. The device of claim 12, wherein the access point is an IEEE 802.11 access point, the device is an IEEE 802.11 device, the wake-up radio includes receiving functionalities, and the primary radio includes both transmitting and receiving functionalities.

14. The device of claim 12, wherein the group receiver identity is used for at least one of multicast or broadcast, and the group receiver identity has a length shorter than a length of a medium access control (MAC) address.

15. The device of claim 12, wherein the wake-up trigger frame further includes an address identifying a node sending data to the device, and the at least one hardware processor is further configured to determine whether to send the signal to turn on the primary radio based on the address.

16. A non-transitory computer-readable medium containing instructions which, when executed, cause a device to perform operations comprising:
receiving, at a wake-up radio of the device and from an access point, a wake-up trigger frame, wherein the wake-up trigger frame includes an identity;
determining whether the identity in the wake-up trigger frame is a unicast receiver identity or a group receiver identity;
in response to determining that the identity in the wake-up trigger frame is the group receiver identity, comparing the group receiver identity with a whitelist, wherein the whitelist comprises a plurality of groupcast addresses that the device intends to wake up for; and
in response to determining that the group receiver identity matches to one of the plurality of groupcast addresses in the whitelist, sending a signal to a primary radio of the device to turn on the primary radio.

17. The non-transitory computer-readable medium of claim 16, wherein the access point is an IEEE 802.11 access point, the device is an IEEE 802.11 device, the wake-up radio has receiving functionalities, and the primary radio has both transmitting and receiving functionalities.

18. The non-transitory computer-readable medium of claim 16, wherein the group receiver identity is used for at least one of multicast or broadcast, and the group receiver identity has a length shorter than a length of a medium access control (MAC) address.

19. The non-transitory computer-readable medium of claim 16, wherein the wake-up trigger frame further includes an address identifying a node sending data to the device, and the operations further comprise determining whether to send the signal to turn on the primary radio based on the address.

20. The non-transitory computer-readable medium of claim 19, wherein the address is included in at least one of a payload field of the wake-up trigger frame or a header of the wake-up trigger frame.

* * * * *